US012316029B2

(12) United States Patent
Rowell et al.

(10) Patent No.: US 12,316,029 B2
(45) Date of Patent: May 27, 2025

(54) ANTENNA ARRAY, ANTENNA SYSTEM AND ANTENNA KIT, EACH BEING ATTACHABLE TO A SURFACE

(71) Applicant: Rohde & Schwarz GmbH & Co. KG, Munich (DE)

(72) Inventors: Corbett Rowell, Prien am Chiemsee (DE); Christoph Hausl, Neubiberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 210 days.

(21) Appl. No.: 18/048,363

(22) Filed: Oct. 20, 2022

(65) Prior Publication Data

US 2024/0136716 A1 Apr. 25, 2024
US 2024/0235028 A9 Jul. 11, 2024

(51) Int. Cl.
*H01Q 7/08* (2006.01)
*H01Q 1/12* (2006.01)
*H01Q 9/28* (2006.01)
*H01Q 21/10* (2006.01)

(52) U.S. Cl.
CPC .................................... *H01Q 7/08* (2013.01)

(58) Field of Classification Search
CPC .......... H01Q 13/02; H01Q 9/28; H01Q 13/00; H01Q 21/00; H01Q 9/04; H01Q 13/04; H01Q 1/28; H01Q 1/48; H01Q 1/52; H01Q 21/20; H01Q 1/22; H01Q 1/36
See application file for complete search history.

(56) References Cited

U.S. PATENT DOCUMENTS

2013/0330511 A1* 12/2013 Sharifi ................ H01Q 17/008 216/13
2013/0341409 A1* 12/2013 Wu ................ G06K 19/07749 235/492
2016/0043472 A1* 2/2016 Fasenfest ............... H01Q 13/02 343/786
2020/0235473 A1* 7/2020 Kaverine ................ H01Q 1/38
2022/0336946 A1* 10/2022 Ryu ........................ H01Q 5/55

* cited by examiner

*Primary Examiner* — Wei (Victor) Y Chan
(74) *Attorney, Agent, or Firm* — Studebaker Brackett PLLC

(57) ABSTRACT

An antenna array being attachable to a surface is provided. Said antenna array comprises at least two antennas, and a magnetic material and/or an alloy with ferro-magnetic properties for magnetically attaching at least one further antenna.

20 Claims, 7 Drawing Sheets

ANTENNA ARRAY, ANTENNA SYSTEM AND ANTENNA KIT, EACH BEING ATTACHABLE TO A SURFACE

TECHNICAL FIELD

The invention relates to an antenna array being attachable to a surface, an antenna system being attachable to a surface, and an antenna kit being attachable to a surface.

BACKGROUND ART

Generally, in times of an increasing number of communication applications providing wireless connectivity possibilities, there is a growing need of an antenna array, antenna system and antenna kit, each being attachable to a surface, for performing measurements with respect to such applications in order to verify their correct functioning in an efficient and accurate manner, whereby a high flexibility is ensured with special respect to different measurement purposes.

In this context of performing measurements, it is exemplarily noted that with special respect to antennas or antenna arrays, respectively, mounted to a vehicle, such as a car or an aircraft, which are employed for network and/or spectrum monitoring, the corresponding capabilities cannot be extended, and thus, disadvantageously, said antennas cannot flexibly be used in different measurement scenarios. There are no antennas or antenna arrays, respectively, known, which allow for different configurations depending on the corresponding measurement scenario, and thus would ensure a high accuracy, efficiency, and flexibility.

Accordingly, there is the object to provide an antenna array, antenna system and antenna kit, each being attachable to a surface, in order to allow for performing measurements, especially measurements regarding wireless connectivity capabilities, in a flexible manner, thereby ensuring a high accuracy and efficiency of the measurement.

SUMMARY OF THE INVENTION

According to a first aspect of the invention, an antenna array being attachable to a surface is provided. Said antenna array comprises at least two antennas, and a magnetic material and/or an alloy with ferro-magnetic properties for magnetically attaching at least one further antenna. Advantageously, this allows for different configurations depending on the corresponding measurement scenario, thereby ensuring a particularly high flexibility, efficiency, and accuracy. Further advantageously, a lower profile directional capability can be achieved in an efficient manner.

According to a first preferred implementation form of the first aspect of the invention, the at least one further antenna comprises or is at least one further antenna array, especially at least one further directional antenna array.

Advantageously, for instance, by stacking at least two antenna arrays, capabilities of car or aircraft mounted antennas for network and/or spectrum monitoring can be extended in an efficient and flexible manner.

According to a second preferred implementation form of the first aspect of the invention, the at least one further antenna comprises a further magnetic material and/or a further alloy with ferro-magnetic properties. Advantageously, for example, a secure but also easily detachable attachment of the at least one further antenna can be achieved.

According to a further preferred implementation form of the first aspect of the invention, the surface is at least part of, especially at least part of the corresponding skin of, a car, a tank, a helicopter, an airplane, or a streetlamp. Advantageously, for instance, the antenna array can efficiently be mounted to a vehicle in the context of network and/or spectrum monitoring.

According to a further preferred implementation form of the first aspect of the invention, the antenna array further comprises a centering unit, especially a centering peg and/or a centering indentation, for axially arranging the at least one further antenna with respect to the antenna array. Advantageously, for example, with respect to the antenna array and the at least one further antenna, the same center can efficiently be achieved especially for the purpose of similar time of arrival.

According to a further preferred implementation form of the first aspect of the invention, the at least one further antenna comprises a further centering unit, especially a further centering peg and/or a further centering indentation, for axially arranging the at least one further antenna with respect to the antenna array. Advantageously, for instance, such an axial arrangement allows for a similar time of arrival.

According to a further preferred implementation form of the first aspect of the invention, the magnetic material and/or the alloy with ferro-magnetic properties is fixed to the antenna array such that the at least one further antenna is located opposite to the surface in the case that the at least one further antenna is magnetically attached. Advantageously, for example, the antenna array has not be detached from the surface when the at least one further antenna is to be attached or exchanged.

According to a further preferred implementation form of the first aspect of the invention, an operational frequency range of the antenna array is lower than a further operational frequency range of the at least one further antenna. Advantageously, for instance, a lower frequency directional antenna array can be mounted directly on a vehicle.

According to a further preferred implementation form of the first aspect of the invention, the antenna array comprises or is a directional antenna array especially with an operational frequency range of 0.6 GHz to 8 GHz. Advantageously, for example, it is noted that an operational frequency range of 0.6 GHz to 18 GHz is also possible.

According to a further preferred implementation form of the first aspect of the invention, the magnetic material and/or the alloy with ferro-magnetic properties is of circular or annular shape. Advantageously, for instance, a symmetrical, and thus secure and efficient, attachment of the at least one further antenna can be achieved.

According to a further preferred implementation form of the first aspect of the invention, the alloy with ferro-magnetic properties comprises or is an iron ring or a steel ring. Advantageously, for example, cost-efficiency can be increased.

According to a further preferred implementation form of the first aspect of the invention, the at least one further antenna comprises or is an omnidirectional antenna or a Global Positioning System (GPS) antenna. Advantageously, for instance, flexibility can be increased.

According to a further preferred implementation form of the first aspect of the invention, the at least one further antenna comprises or is a directional antenna array with a further operational frequency range of 17 GHz to 44 GHz. Advantageously, for example, a further operational frequency range of 4.5 GHz to 53 GHz can also be possible.

According to a further preferred implementation form of the first aspect of the invention, the antenna array comprises a hole for cable routing from the at least one further antenna. Advantageously, for instance, cable routing can be achieved in a cost-efficient manner.

According to a further preferred implementation form of the first aspect of the invention, the hole is located in the center of the antenna array. Advantageously, for example, a low interference cable routing can efficiently be achieved.

According to a further preferred implementation form of the first aspect of the invention, at least one cable from the at least one further antenna is routed in such a manner as to not interfere with the antenna array. Advantageously, for instance, the antenna array can comprise a cost-efficient cable inset.

According to a further preferred implementation form of the first aspect of the invention, the magnetic material comprises or is an embedded magnet. In addition to this or as an alternative, the alloy with ferro-magnetic properties comprises or is an embedded ferro-metal. Advantageously, for example, complexity can be reduced, thereby further increasing efficiency.

According to a further preferred implementation form of the first aspect of the invention, the magnetic material and/or the alloy with ferro-magnetic properties is fixed to the antenna array by glue. Advantageously, for instance, a simple, and thus cost-efficient, fixing can be achieved.

According to a second aspect of the invention, an antenna system being attachable to a surface is provided. Said antenna system comprises an antenna array according to the first aspect of the invention or any of its preferred implementation forms, respectively, and at least one further antenna being magnetically attached to the antenna array. Advantageously, this allows for different configurations depending on the corresponding measurement scenario, thereby ensuring a particularly high flexibility, efficiency, and accuracy. Further advantageously, a lower profile directional capability can be achieved in an efficient manner.

According to a third aspect of the invention, an antenna kit being attachable to a surface is provided. Said antenna kit comprises an antenna array according to the first aspect of the invention or any of its preferred implementation forms, respectively, and at least one further antenna being magnetically attachable to the antenna array. Advantageously, this allows for different configurations depending on the corresponding measurement scenario, thereby ensuring a particularly high flexibility, efficiency, and accuracy. Further advantageously, a lower profile directional capability can be achieved in an efficient manner.

BRIEF DESCRIPTION OF THE DRAWINGS

Exemplary embodiments of the invention are now further explained with respect to the drawings by way of example only, and not for limitation. In the drawings.

DETAILED DESCRIPTION OF THE PREFERRED EMBODIMENTS

Figure 1:
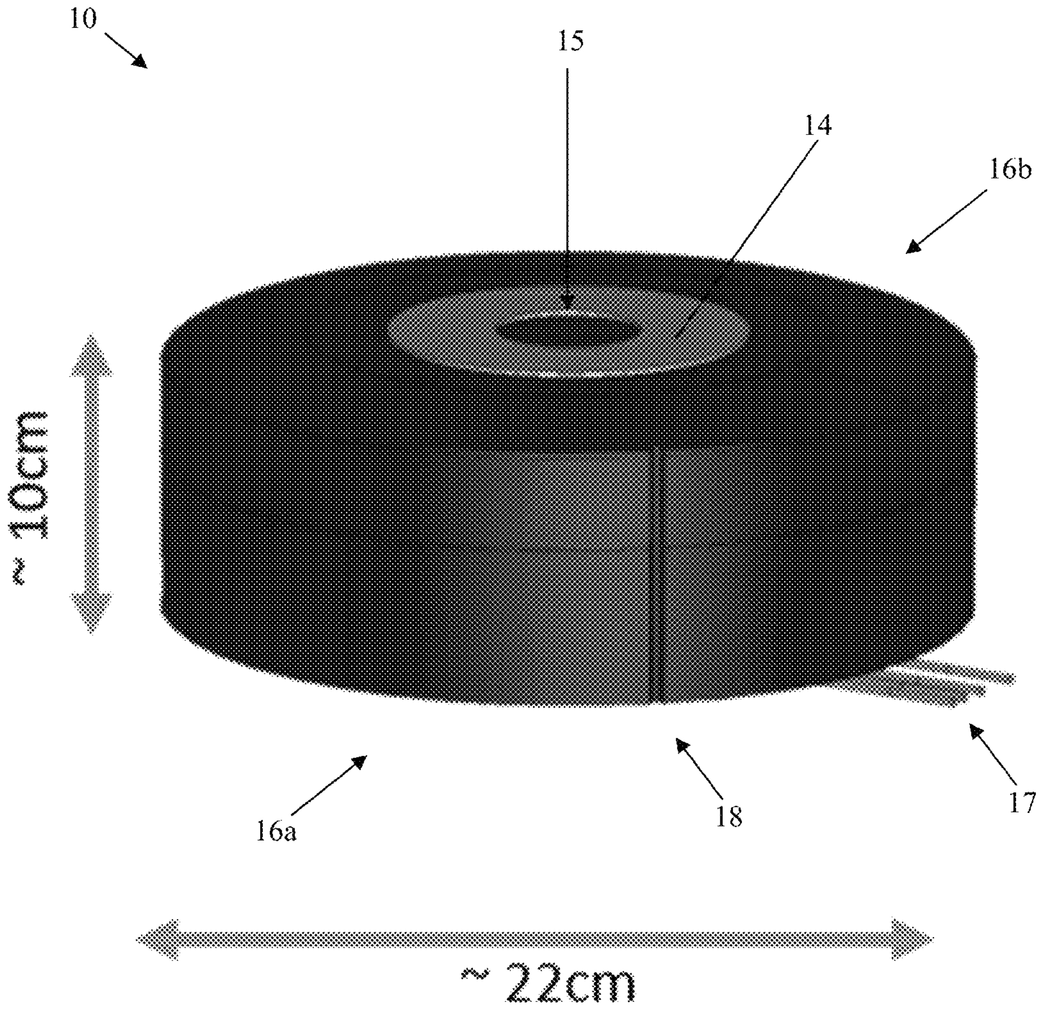
FIG. 1 shows an exemplary embodiment of the first aspect of the invention.

Firstly, FIG. 1 illustrates an exemplary embodiment of an antenna array 10 being attachable to a surface.

In accordance with FIG. 1, said antenna array 10 comprises at least two antennas, which cannot be seen in this embodiment due to a housing of the array 10, and a magnetic material and/or an alloy with ferro-magnetic properties, exemplarily equipped with reference sign 14, for magnetically attaching at least one further antenna.

It is noted that said at least one further antenna can be further antenna array, especially at least one further directional antenna array.

It is further noted that the antenna array 10 can also be a directional antenna array.

It might be particularly advantageous if the at least one further antenna or the further antenna array, respectively, comprises a further magnetic material and/or a further alloy with ferro-magnetic properties.

With respect to the surface, to which the antenna array 10 is attachable, it is note that said surface can be at least part of, especially at least part of the corresponding skin of, a car, a tank, a helicopter, an airplane, or a street lamp.

In this context, it is mentioned that the antenna array 10 exemplarily comprises a first surface 16*a* for attaching the antenna array 10 to the above-mentioned surface which is not explicitly shown. Said first surface 16*a* can be attached to the surface, for instance, in a magnetic manner or by gluing, screwing, nailing, or the like.

As it can further be seen from FIG. 1, the antenna array 10 further comprises a centering unit, exemplarily a centering indentation 15, for axially arranging the at least one further antenna or the further antenna array, respectively with respect to the antenna array 10.

In this context, it might be particularly advantageous if the at least one further antenna or the further antenna array, respectively, comprises a further centering unit, exemplarily a further centering peg, for axially arranging the at least one further antenna or the further antenna array, respectively, with respect to the antenna array 10.

Furthermore, the magnetic material and/or the alloy with ferro-magnetic properties, exemplarily equipped with reference sign 15, is fixed to the antenna array 10 such that the at least one further antenna or the further antenna array, respectively, is located opposite to the surface in the case that the at least one further antenna or the further antenna array, respectively, is magnetically attached.

In this context, it is mentioned that the antenna array 10 exemplarily comprises a second surface 16*b* opposite to the above-mentioned first surface 16*a*. Moreover, said second surface 16*b* comprises the magnetic material and/or the alloy with ferro-magnetic properties, exemplarily equipped with reference sign 15, or said magnetic material and/or the alloy with ferro-magnetic properties is fixed to the second surface 16*b*, respectively.

It is additionally noted that the term “opposite” can especially be understood in a manner that each of at least one pair out of respective normals to the surface, the first surface 16*a*, and the second surface 16*b*, deviate not more than 10 degrees, preferably 5 degrees, more preferably 2 degrees, most preferably 0.5 degrees, from a certain direction.

Furthermore, an operational frequency range of the antenna array 10 is lower than a further operational frequency range of the at least one further antenna or the further antenna array, respectively.

Moreover, the antenna array 10 can comprise or be a directional antenna array exemplarily with an operational frequency range of 0.6 GHz to 18 GHz.

As it can further be seen from FIG. 1, the magnetic material and/or the alloy with ferro-magnetic properties, exemplarily equipped with reference sign 15, is of annular shape. In particular, the alloy with ferro-magnetic properties is a ferro-metal ring, especially a steel ring.

It is noted that it might be particularly advantageous if the antenna array 10 comprises a hole for cable routing from the at least one further antenna. Further advantageously, said hole can be located in the center of the antenna array 10.

In this exemplary case according to FIG. 1, the antenna array 10 comprises a cable inset 18 especially for the at least one further antenna or the further antenna array, respectively.

Said cable inset 18, especially in the sense of the length thereof, is substantially perpendicular to at least one of the surface, the first surface 16*a*, and the second surface 16*b*. Furthermore, said cable inset 18 may preferably be arranged in the vicinity of the housing of the antenna array. More preferably, the cable inset 18 may be arranged such that said cable inset 18 is located as far as possible from the center of the antenna array 10.

It is noted that the term “substantially perpendicular” is especially to be understood as an angle between 80 degrees and 100 degrees, preferably between 85 degrees and 95 degrees, more preferably between 88 degrees and 92 degrees, most preferably between 89.5 degrees and 90.5 degrees.

It is further noted that the antenna array 10 comprises at least one cable, especially at least one radio frequency cable, exemplarily four radio frequency cables.

Furthermore, the antenna array 10, especially each of the first surface 16*a* and the second surface 16*b*, is of a circular shape.

It is noted that a diameter of said circular shape can be between 18 cm and 26 cm, preferably between 20 cm and 24 cm, more preferably between 21 cm and 23 cm, most preferably between 21.5 cm and 22.5 cm.

Moreover, a height of the antenna array 10, especially in the sense of a distance between the first surface 16*a* and the second surface 16*b*, can be between 6 cm and 14 cm, preferably between 8 cm and 12 cm, more preferably between 9 cm and 11 cm, most preferably between 9.5 cm and 10.5 cm.

Figure 2:
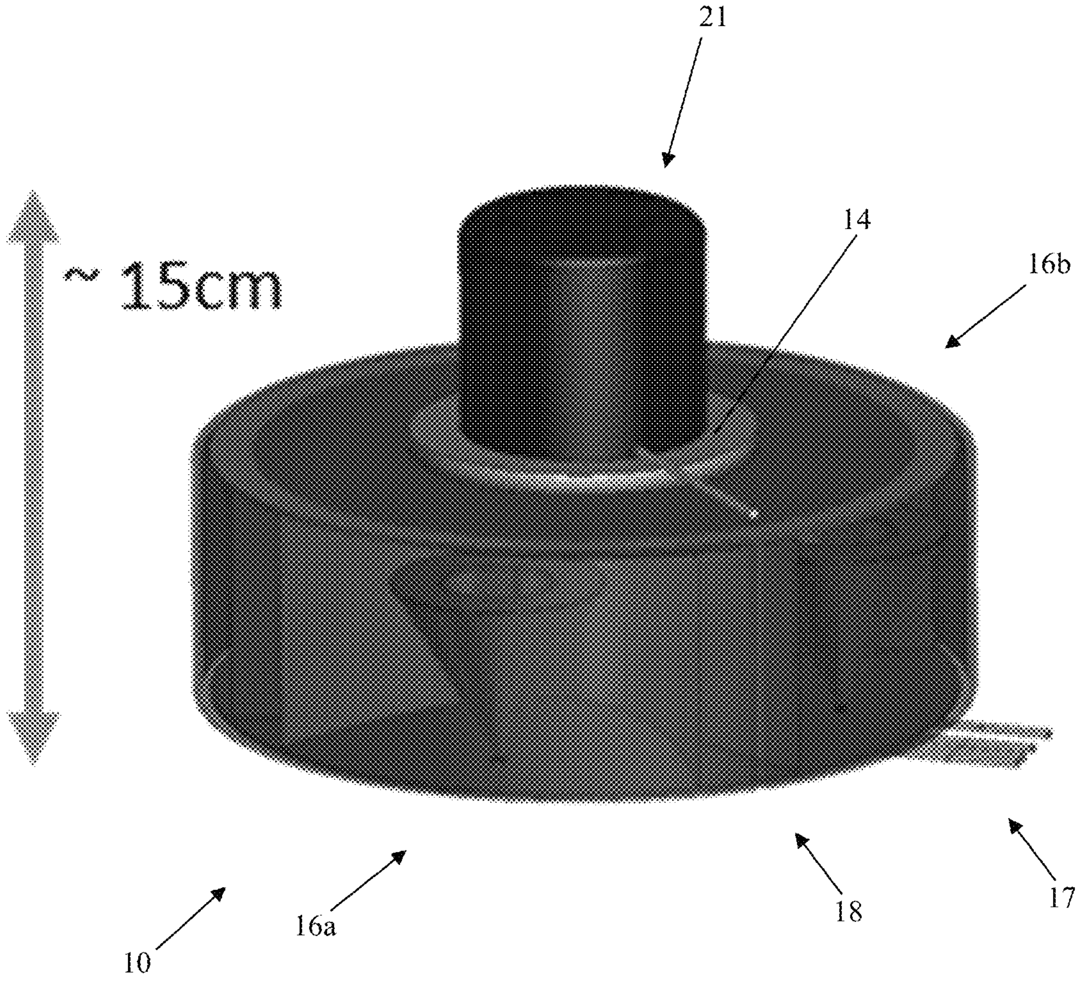
FIG. 2 shows a first exemplary embodiment of the second aspect of the invention.

Now, with respect to FIG. 2, a first exemplary embodiment of the inventive antenna system is depicted.

Said antenna system comprises the antenna array 10 according to FIG. 1 and a further antenna, exemplarily an omnidirectional antenna 21 with a further operating frequency of 0.6 GHz to 6 GHz.

It is noted that the explanations above regarding the at least one further antenna or the further antenna array, respectively, can analogously apply for the omnidirectional antenna 21.

As it can further be seen from FIG. 2, a height of the antenna system, especially in the sense of a distance between the first surface 16*a* of the antenna array 10 or the surface, respectively, and the farthest surface of the omnidirectional antenna 21 therefrom, is between 11 cm and 19 cm, preferably between 13 cm and 17 cm, more preferably between 14 cm and 16 cm, most preferably between 14.5 cm and 15.5 cm.

It is noted that the omnidirectional antenna 21 can alternatively be a Global Positioning System (GPS) antenna.

Figure 3:
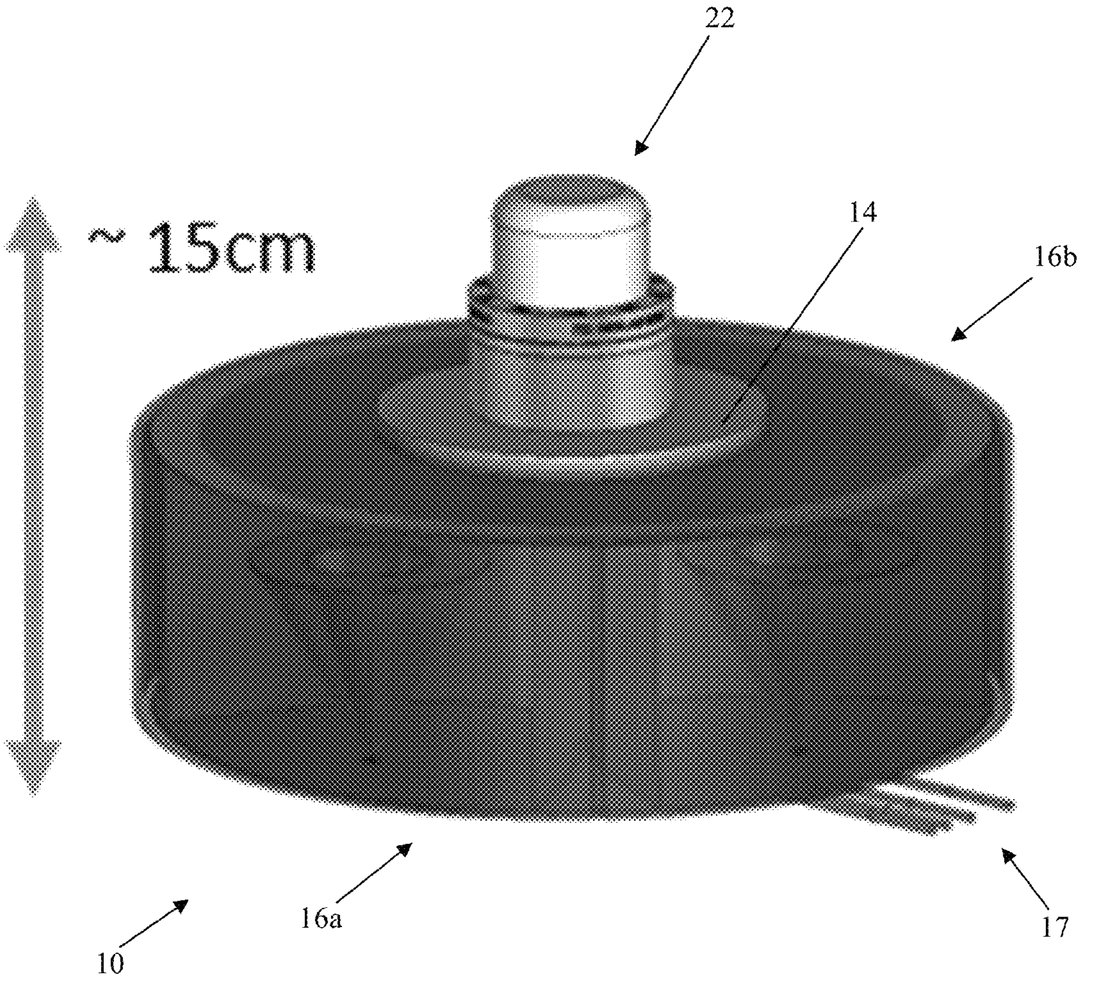
FIG. 3 shows a second exemplary embodiment of the second aspect of the invention.

In accordance with FIG. 3, a second exemplary embodiment of the inventive antenna system is depicted.

Said antenna system comprises the antenna array 10 according to FIG. 1 and a further antenna, exemplarily an omnidirectional antenna 22 with a further operating frequency of 4.5 GHz to 70 GHz.

It is noted that the explanations above regarding the at least one further antenna or the further antenna array, respectively, can analogously apply for the omnidirectional antenna 22.

As it can further be seen from FIG. 3, a height of the antenna system, especially in the sense of a distance between the first surface 16*a* of the antenna array 10 or the surface, respectively, and the farthest surface of the omnidirectional antenna 22 therefrom, is between 11 cm and 19 cm, preferably between 13 cm and 17 cm, more preferably between 14 cm and 16 cm, most preferably between 14.5 cm and 15.5 cm.

It is noted that the omnidirectional antenna 22 can alternatively be a GPS antenna.

Figure 4:
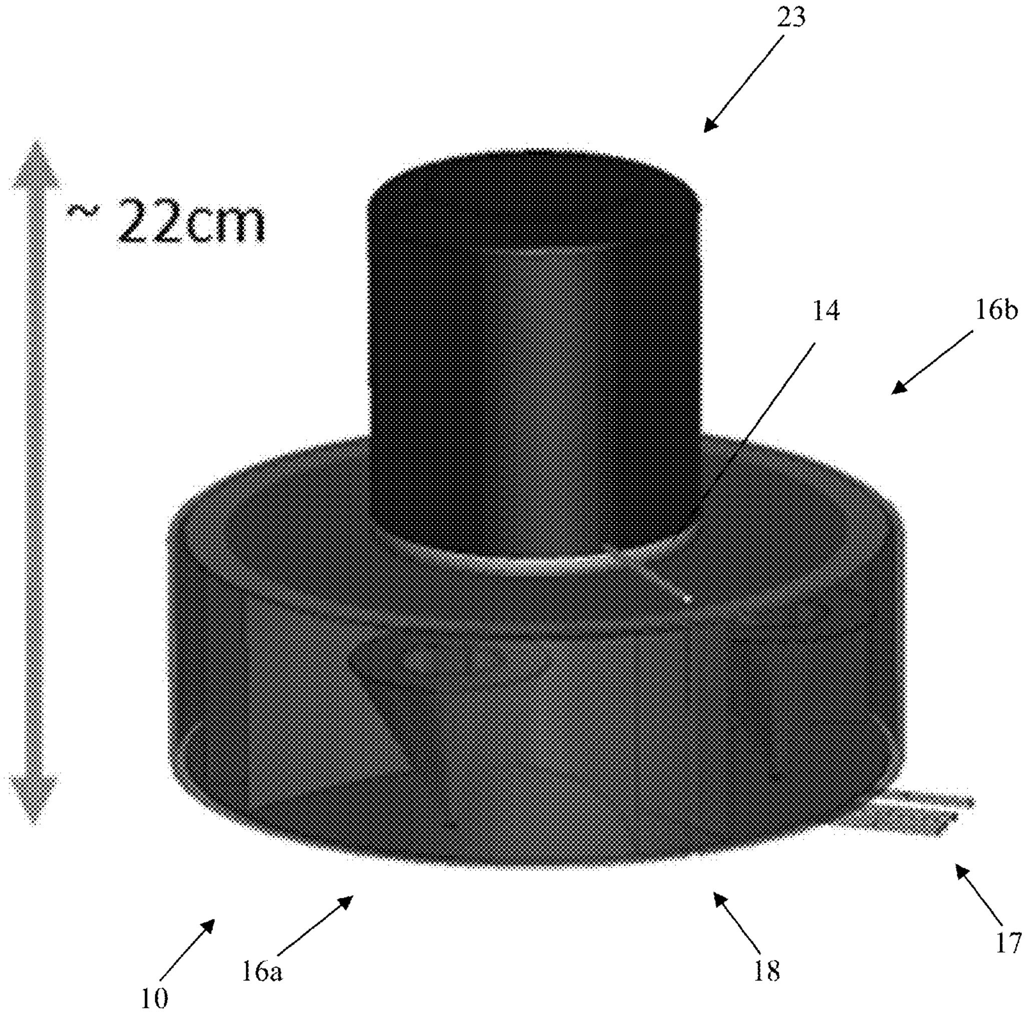
FIG. 4 shows a third exemplary embodiment of the second aspect of the invention.

Furthermore, FIG. 4 illustrates a third exemplary embodiment of an antenna system in accordance with the second aspect of the invention.

Said antenna system comprises the antenna array 10 according to FIG. 1 and a further antenna, exemplarily an omnidirectional antenna 23 with a further operating frequency of 0.45 GHz to 6 GHz.

It is noted that the explanations above regarding the at least one further antenna or the further antenna array, respectively, can analogously apply for the omnidirectional antenna 23.

As it can further be seen from FIG. 4, a height of the antenna system, especially in the sense of a distance between the first surface 16*a* of the antenna array 10 or the surface, respectively, and the farthest surface of the omnidirectional antenna 22 therefrom, is between 18 cm and 26 cm, preferably between 20 cm and 24 cm, more preferably between 21 cm and 23 cm, most preferably between 21.5 cm and 22.5 cm.

It is noted that the omnidirectional antenna 23 can alternatively be a GPS antenna.

Figure 5:
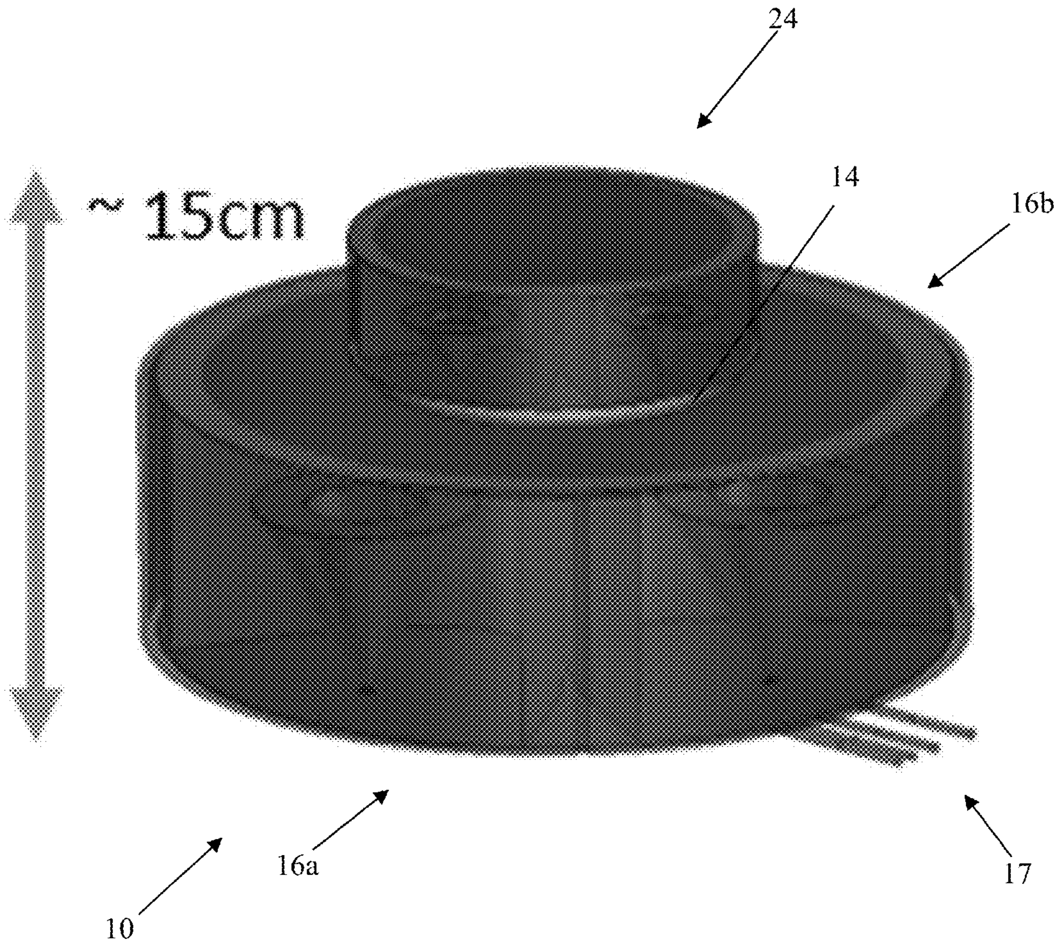
FIG. 5 shows a fourth exemplary embodiment of the second aspect of the invention.

Now, with respect to FIG. 5, a fourth exemplary embodiment of the inventive antenna system is shown.

Said antenna system comprises the antenna array 10 according to FIG. 1 and a further antenna array, exemplarily an directional antenna array 24 with a further operating frequency of 4.5 GHz to 53 GHz.

It is noted that the explanations above regarding the at least one further antenna or the further antenna array, respectively, can analogously apply for the directional antenna array 24.

As it can further be seen from FIG. 5, a height of the antenna system, especially in the sense of a distance between the first surface 16*a* of the antenna array 10 or the surface, respectively, and the farthest surface of the directional antenna array 24 therefrom, is between 11 cm and 19 cm, preferably between 13 cm and 17 cm, more preferably between 14 cm and 16 cm, most preferably between 14.5 cm and 15.5 cm.

It is noted that it might be particularly advantageous if the antenna array 24 is of the same type as the antenna array 10.

It is further noted that a diameter of the antenna array 24 may be at least 20 percent, preferably at least 30 percent, more preferably at least 45 percent, most preferably at least 50 percent, smaller than the diameter of the antenna array 10.

Moreover, with respect to the antenna array 10, the above-mentioned omnidirectional antennas 21, 22, 23, and the above-mentioned directional antenna array 24, it is noted that the antenna array 10 and at least a part of said omnidirectional antennas 21, 22, 23, and said directional antenna array 24 can form an antenna kit according to the third aspect of the invention.

Figure 6:
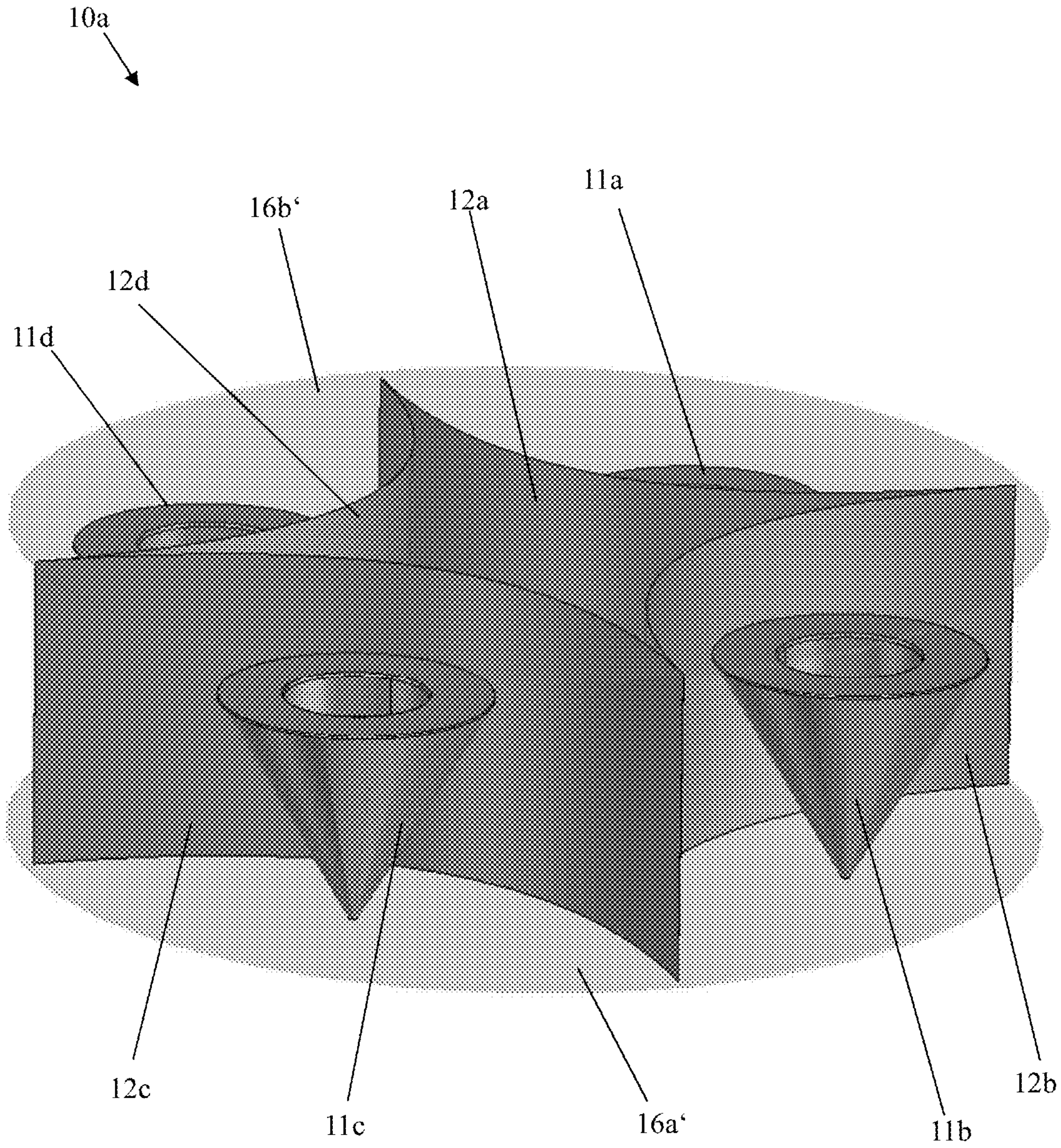
FIG. 6 shows an exemplary embodiment of an antenna array in the sense of the invention.

Furthermore, FIG. 6 depicts an antenna array 10*a* in the sense of the invention in more detail. In this context, it is noted that the above-mentioned antenna array 10 can be such an antenna array 10*a*.

Said antenna array 10*a* comprises a monocone feed 11*a* for inputting an input signal and/or outputting an output signal, and a reflecting surface 12*a* comprising a parabolic shape for transmitting the input signal as an electromagnetic output wave and/or receiving an electromagnetic input wave as the output signal.

As it can further be seen from FIG. 6, the parabolic shape is a two-dimensional parabolic shape. Additionally, the reflecting surface 12*a* is sandwiched between two planar surfaces 16*a*', 16*b*', which can be seen as the above-mentioned first surface 16*a* and the second surface 16*b* in an analogous manner.

It is noted that the reflecting surface 12 and said two planar surfaces 16*a*', 16*b*' especially form a cavity. Preferably, the above-mentioned monocone feed 11*a* is located inside said cavity.

Moreover, the antenna array 10*a* further comprises at least one further monocone feed, exemplarily three further monocone feeds 11*b*, 11*c*, 11*d* for inputting the input signal and/or outputting the output signal and/or for inputting a further input signal and/or outputting a further output signal, and at least one further reflecting surface, exemplarily three further reflecting surfaces 12*b*, 12*c*, 12*d*, each comprising a further parabolic shape for transmitting the input signal as the electromagnetic output wave and/or receiving the electromagnetic input wave as the output signal and/or for transmitting the further input signal as a further electromagnetic output wave and/or receiving a further electromagnetic input wave as the further output signal.

It is noted that the explanations above, especially regarding the monocone feed 11*a* and the reflecting surface 12*a*, can analogously be applied for at least one, preferably each, of said further monocone feeds 11*b*, 11*c*, 11*d* and said further reflecting surfaces 12*b*, 12*c*, 12*d*.

It is further noted that it might be particularly advantageous if the monocone feed 11*a*, the reflecting surface 12*a*, the at least one further monocone feed, exemplarily the three further monocone feeds 11*b*, 11*c*, 11*d*, and the at least one further reflecting surface, exemplarily the three further reflecting surfaces 12*b*, 12*c*, 12*d*, are arranged to form a directional array, especially a switched directional array.

As it can further be seen from FIG. 6, the monocone feed 11*a*, the reflecting surface 12*a*, the at least one further monocone feed, exemplarily the three further monocone feeds 11*b*, 11*c*, 11*d*, and the at least one further reflecting surface, exemplarily the three further reflecting surfaces 12*b*, 12*c*, 12*d*, are arranged in a circular manner.

In addition to this, the planar surfaces 16*a*', 16*b*', to which the above-mentioned corresponding explanations especially apply in an analogous manner, are of circular shape and/or of the same size.

It is further noted that the monocone feed 11*a* and the three further monocone feeds 11*b*, 11*c*, 11*d* substantially form the corners of an imaginary square. In other words, an angle between two neighboring ones of said monocone feeds 11*a*, 11*b*, 11*c*, 11*d* is between 80 degrees and 100 degrees, preferably between 85 degrees and 95 degrees, more preferably between 88 degrees and 92 degrees, most preferably between 89.5 degrees and 90.5 degrees.

With respect the antenna array 10*a* of FIG. 6, it is noted that it might be particularly advantageous if the antenna array 10*a* further comprises at least one object, preferably at least one metallic object, more preferably at least one grounded metallic object, arranged in the vicinity of the reflecting surface 12*a* or the further reflecting surfaces 12*b*, 12*c*, 12*d*, respectively, especially for directing the electromagnetic output wave and/or the electromagnetic input wave or the further electromagnetic output wave and/or the further electromagnetic input wave, respectively.

With respect to the above-mentioned vicinity, it is noted that said vicinity may preferably refer to the corresponding volume of the above-mentioned cavity.

Finally, it is noted that the number of monocone feeds, such as the above-mentioned monocone feeds 11*a*, 11*b*, 11*c*, 11*d* of FIG. 6, or reflecting surfaces, such as the above-mentioned reflecting surfaces 12*a*, 12*b*, 12*c*, 12*d* of said FIG. 6, respectively, can be varied.

Figure 7:
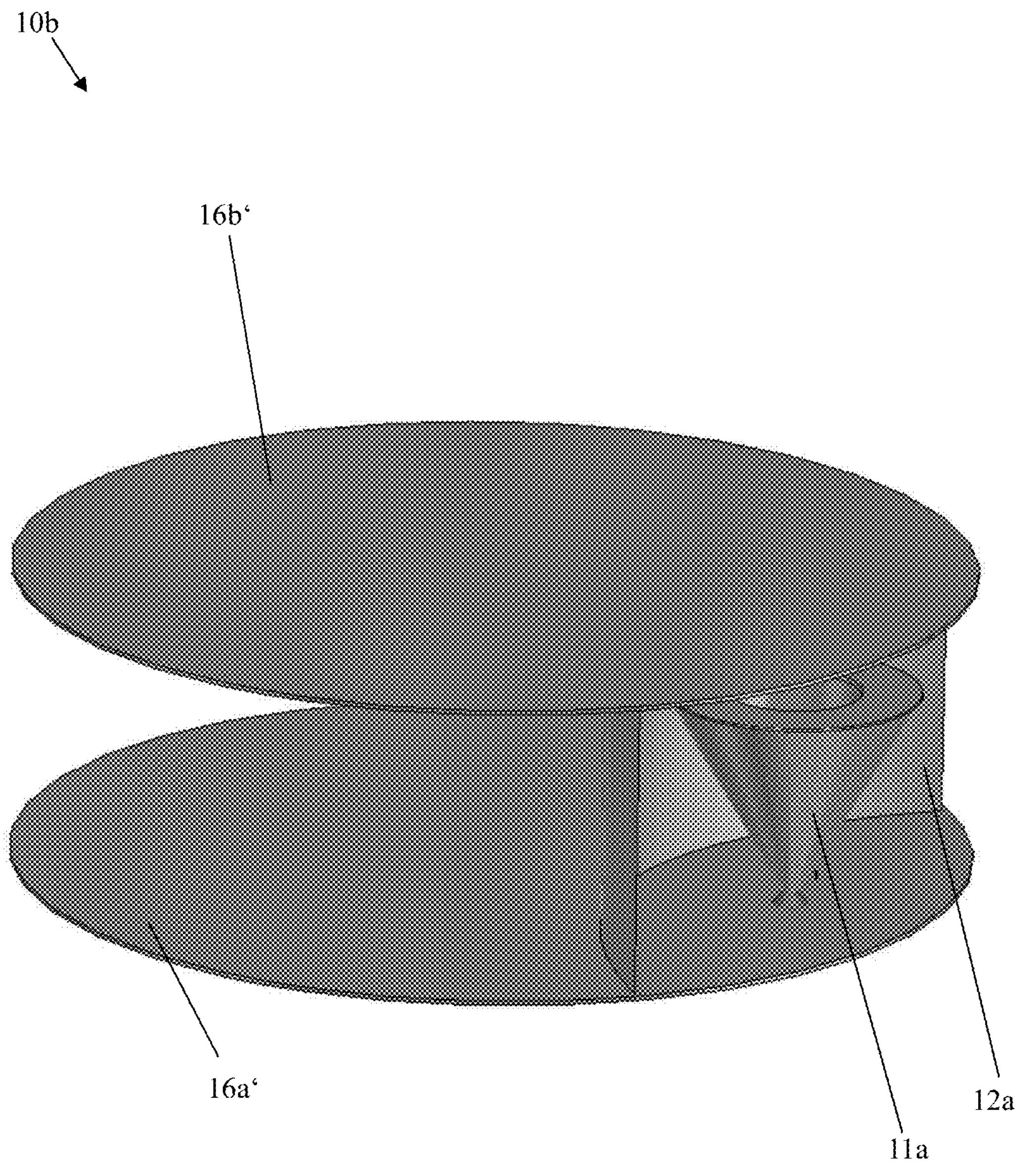
FIG. 7 shows a further exemplary embodiment of an antenna array in the sense of the invention.

For instance, in accordance with FIG. 7 illustrating a further antenna array 10*b* in the sense of the invention, the further monocone feeds 11*b*, 11*c*, 11*d*, and the further reflecting surfaces 12*b*, 12*c*, 12*d* can be omitted.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. An antenna array being attachable to a surface, the antenna array comprising:

at least two antennas, a magnetic material and/or an alloy with ferro-magnetic properties for magnetically attaching at least one further antenna, a cable inset for the at least one further antenna, a first surface for attaching the antenna array to the surface, and a second surface opposite to the first surface, wherein the cable inset in the sense of the length thereof is substantially perpendicular to at least one of the first surface and the second surface, and wherein a height of the antenna array in the sense of a distance between the first surface and the second surface is between 6 cm and 14 cm.

2. The antenna array according to claim 1, wherein the at least one further antenna comprises or is at least one further antenna array, especially at least one further directional antenna array.

3. The antenna array according to claim 1, wherein the at least one further antenna comprises a further magnetic material and/or a further alloy with ferro-magnetic properties.

4. The antenna array according to claim 1, wherein the surface is at least part of, especially at least part of the corresponding skin of, a car, a tank, a helicopter, an airplane, or a streetlamp.

5. The antenna array according to claim 1, wherein the antenna array further comprises a centering unit, especially a centering peg and/or a centering indentation, for axially arranging the at least one further antenna with respect to the antenna array.

6. The antenna array according to claim 1, wherein the at least one further antenna comprises a further centering unit, especially a further centering peg and/or a further centering indentation, for axially arranging the at least one further antenna with respect to the antenna array.

7. The antenna array according to claim 1, wherein the magnetic material and/or the alloy with ferro-magnetic properties is fixed to the antenna array such that the at least one further antenna is located opposite to the surface in the case that the at least one further antenna is magnetically attached.

8. The antenna array according to claim 1, wherein an operational frequency range of the antenna array is lower than a further operational frequency range of the at least one further antenna.

9. The antenna array according to claim 1, wherein the antenna array comprises or is a directional antenna array especially with an operational frequency range of 0.6 GHz to 8 GHz.

10. The antenna array according to claim 1, wherein the magnetic material and/or the alloy with ferro-magnetic properties is of circular or annular shape.

11. The antenna array according to claim 1, wherein the alloy with ferro-magnetic properties comprises or is an iron ring or a steel ring.

12. The antenna array according to claim 1, wherein the at least one further antenna comprises or is an omnidirectional antenna or a Global Positioning System (GPS) antenna.

13. The antenna array according to claim 1, wherein the at least one further antenna comprises or is a directional antenna array with a further operational frequency range of 17 GHz to 44 GHz.

14. The antenna array according to claim 1, wherein the antenna array comprises a hole for cable routing from the at least one further antenna.

15. The antenna array according to claim 14, wherein the hole is located in the center of the antenna array.

16. The antenna array according to claim 1, wherein at least one cable from the at least one further antenna is routed in such a manner as to not interfere with the antenna array.

17. The antenna array according to claim 1, wherein the magnetic material comprises or is an embedded magnet, and/or wherein the alloy with ferro-magnetic properties comprises or is an embedded ferro-metal.

18. The antenna array according to claim 1, wherein the magnetic material and/or the alloy with ferro-magnetic properties is fixed to the antenna array by glue.

19. An antenna system being attachable to a surface, the antenna system comprising:

an antenna array according to claim 1, and at least one further antenna being magnetically attached to the antenna array.

20. An antenna kit being attachable to a surface, the antenna kit comprising:

an antenna array according to claim 1, and at least one further antenna being magnetically attachable to the antenna array.

* * * * *